US011999603B2

(12) United States Patent
Sukalski et al.

(10) Patent No.: US 11,999,603 B2
(45) Date of Patent: Jun. 4, 2024

(54) FORKLIFT SCALE SENSOR ATTACHMENT AND MOUNTING

(71) Applicant: Illinois Tool Works Inc., Glenview, IL (US)

(72) Inventors: Andrew Sukalski, Fairmont, MN (US); Thomas Howard Johnson, Winnebago, MN (US); Kevin Detert, Fairmont, MN (US); Cory Hainy, Fairmont, MN (US); Eric Holland, Lake Crystal, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/585,915

(22) Filed: Jan. 27, 2022

(65) Prior Publication Data

US 2022/0267130 A1 Aug. 25, 2022

Related U.S. Application Data

(60) Provisional application No. 63/153,535, filed on Feb. 25, 2021.

(51) Int. Cl.
*B66F 17/00* (2006.01)
*B66F 9/08* (2006.01)

(52) U.S. Cl.
CPC .............. *B66F 17/003* (2013.01); *B66F 9/08* (2013.01)

(58) Field of Classification Search
CPC ....... B66F 17/003; B66F 9/08; B66F 9/07504
See application file for complete search history.

(56) References Cited

U.S. PATENT DOCUMENTS

| | | | | |
|---|---|---|---|---|
| 4,323,132 A * | 4/1982 | Bradley | G01G 19/083 | 177/139 |
| 4,421,186 A * | 12/1983 | Bradley | G01G 3/1404 | 177/139 |
| 9,464,930 B2 * | 10/2016 | Santi | G01G 19/12 | |
| 9,562,801 B2 * | 2/2017 | Santi | G01G 3/14 | |
| 2014/0262550 A1 * | 9/2014 | Santi | G01G 19/12 | 177/136 |
| 2015/0093216 A1 * | 4/2015 | Pangrazio | B66F 9/07504 | 177/139 |
| 2017/0129754 A1 * | 5/2017 | Pangrazio | B66F 9/07504 | |
| 2020/0309589 A1 | 10/2020 | Sukalski | | |

FOREIGN PATENT DOCUMENTS

| | | | |
|---|---|---|---|
| EP | 3760574 A1 * | 1/2021 | B66F 17/003 |
| WO | 2010091219 | 8/2010 | |

OTHER PUBLICATIONS

Int'l Search Report and Written Opinion Appln No. PCT/US2022/015016 dated Jun. 15, 2022.

* cited by examiner

*Primary Examiner* — Diem M Tran
(74) *Attorney, Agent, or Firm* — McAndrews, Held & Malloy, Ltd.

(57) ABSTRACT

The present disclosure provides a lift truck attachment system that includes a lift truck weighing device with a carriage mounted scale configured to support load handling fixtures and to be secured to a lift truck carriage. The weighing device includes one or more sensors arranged at a mounting interface between the lift truck carriage and the carriage mounted scale. The lift truck weighing device includes one or more of rails, plates, and/or mounting brackets, as a list of non-limiting examples, arranged at the interface with the one or more sensors, which measure a load from the load handling fixtures.

16 Claims, 12 Drawing Sheets

FORKLIFT SCALE SENSOR ATTACHMENT AND MOUNTING

CROSS-REFERENCE TO RELATED APPLICATIONS

This application hereby claims priority to and the benefit of U.S. Provisional Application Ser. No. 63/153,535, entitled "Forklift Scale Sensor Attachment And Mounting," filed Feb. 25, 2021. U.S. Provisional Application Ser. No. 63/153,535 is hereby incorporated by reference in its entireties for all purposes.

BACKGROUND

Attachments to lift trucks can be added to a standard carriage that normally carries the lifting forks. Some attachments can include a scale to measure a load of a lift truck scale. However, additional attachments can reduce the lift capacity of the lift truck, and make removal and/or repair of the scale difficult.

Accordingly, there is a need for an attachment to be mounted to a lift truck that simplifies sensor arrangements and that is easy to install, remove, and repair.

SUMMARY

Disclosed is a lift truck attachment system that includes a lift truck weighing device with a carriage mounted scale configured to support load handling fixtures and to be secured to a lift truck carriage. In particular, the weighing device includes one or more sensors arranged at a mounting interface between the lift truck carriage and the carriage mounted scale. In disclosed examples, the lift truck weighing device includes one or more of rails, plates, and/or mounting brackets, as a list of non-limiting examples, arranged at the interface with the one or more sensors, which measure a load from the load handling fixtures.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1A:
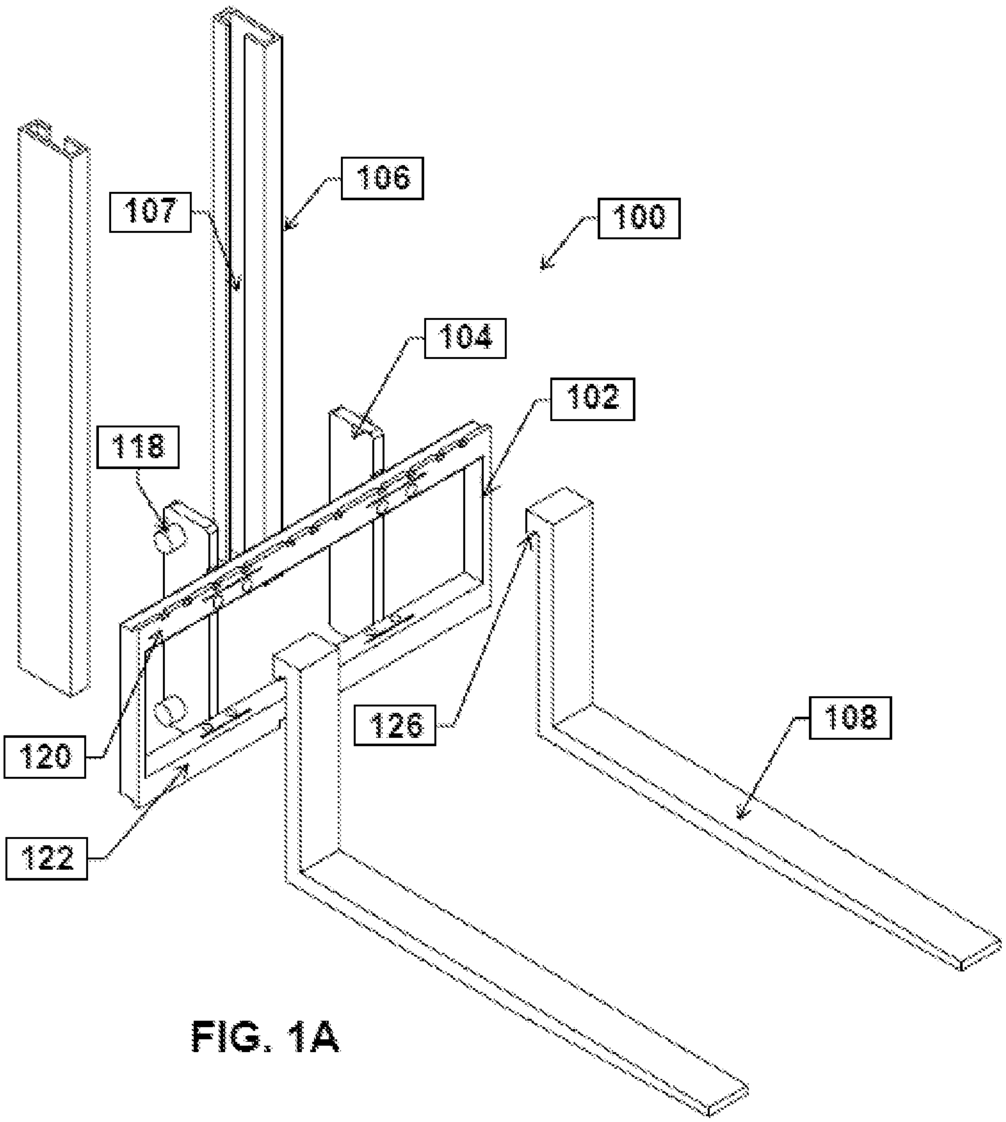
FIG. 1A is a perspective illustration of an example lift truck attachment system employing one or more sensors integrated in one or more rails, in accordance with aspects of this disclosure.

The present disclosure describes a lift truck attachment system that includes a lift truck weighing device with a carriage mounted scale configured to support load handling fixtures and to be secured to a lift truck carriage. In particular, the weighing device includes one or more sensors arranged at a mounting interface between the lift truck carriage and the carriage mounted scale. In disclosed examples, the lift truck weighing device includes one or more of rails, plates, and/or mounting brackets, as a list of non-limiting examples, arranged at the interface with the one or more sensors, which measure a load from the load handling fixtures.

The disclosed lift truck attachment system provides advantages over conventional lift truck designs by enabling devices (i.e. a carriage mounted scale, a side-shifter, etc.) to be attached to the lift truck via a weighing device assembly, as well as no or a minimal loss in lifting capacity due to reduction of redundant or unnecessary parts. In contrast to conventional designs, the disclosed lift truck weighing systems have eliminated the requirements for redundant parts that were included to address one or more regulatory standards. These extra parts cause the lifting capacity to be de-rated due to the extra weight, as well as an extended distance of the attachment.

In disclosed examples, a lift truck carriage comprising one or more rails, each rail comprising a fixture mount to support one or more load handling fixtures and a base portion to house a sensor configured to measure forces on the one or more rails from the one or more load handling fixtures.

In some examples, the one or more load handling fixtures are mounted to a plate supported by the one or more rails. In examples, the one or more rails is removably secured to the lift truck carriage.

In some examples, the fixture mount has a void at an interface between the base portion and the fixture mount, the void being aligned with the load sensor. In examples, two or more support brackets configured to secure the one or more rails in a fixed orientation, and arranged between a pair of masts of a lift truck.

In some examples, the one or more rails comprises a first and a second rail, the first rail oriented within the support brackets such that a first fixture mount of the first rail is arranged above a first base portion housing a first load sensor. In examples, the second rail is oriented within the support brackets such that a second fixture mount of the second rail is arranged laterally to a second base portion housing a second load sensor.

In some examples, the second fixture mount is oriented facing opposite a lift truck.

In disclosed examples, a lift truck weighing device comprising a loading plate configured to support one or more load handling fixtures, the loading plate comprising one or more openings arranged between two or more fasteners configured to secure the loading plate to a lift truck carriage, wherein the one or more openings to house a load sensor configured to measure forces on the loading plate from the one or more load handling fixtures.

In some examples, the one or more openings are arranged between two or more fasteners configured to secure the loading plate to a mounting plate. In examples, another fastener secures the mounting plate to the lift truck carriage. In examples, the one or more openings extends through the mounting plate.

In some examples, the load sensor is a strain gauge.

In disclosed examples, a lift truck weighing device comprising a loading plate configured to support one or more load handling fixtures; a mounting plate configured to secure the lift truck weighing device to a lift truck carriage; one or more sensor plates arranged between the loading plate and the mounting plate, the one or more sensor plates being secured to the loading plate at a first portion and secured to the mounting plate at a second portion; and one or more sensors arranged on the one or more sensor plates between the first and second portions, the one or more sensors configured to measure forces transferred from the loading plate to the mounting plate through the one or more sensor plates.

In some examples, a first sensor of the one or more sensors is arranged on an upper portion of a first sensor plate of the one or more sensor plates, and a second sensor of the one or more sensors is arranged on a lower portion of the first sensor plate.

In disclosed examples, a lift truck weighing device comprising a carriage mounted scale configured to support one or more load handling fixtures and to be secured to a lift truck carriage that includes one or more rails secured to the lift truck carriage; and one or more sensors arranged at a mounting interface between the lift truck carriage and the carriage mounted scale, the one or more sensors configured to measure a load from the one or more load handling fixtures.

In some examples, one or more mounting blocks with the one or more sensors incorporated therein, the one or more mounting blocks configured to secure the lift truck carriage to the carriage mounted scale.

In some examples, the one or more sensors are incorporated in the carriage mounted scale and arranged between a load handing fixture mount and a mounting fastener between the lift truck carriage and the carriage mounted scale.

In some examples, the lift truck carriage includes one or more holes to accept at least part of the one or more sensors or a mounting fastener in the lift truck carriage as the one or more sensors extend from the lift truck scale.

Accordingly, the disclosed examples provide a lift truck weighing system provides a versatile system, with increased lift capacity and reduced cost for advanced lift truck attachments. The arrangement of sensors can be modified, as well as provision of measurements to a computing platform, to capture load data for processing, such as compensation and filtering, to improve measurement accuracy.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" may be used to enumerate different components or elements of the same type, and do not necessarily imply any particular order.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

FIG. 1A illustrates an example lift truck attachment system 100, in accordance with aspects of this disclosure. For example, masts 106 are supported by a lift truck (not shown), which allow a lift truck carriage 104 to move via a mechanical lift in response to a user command. As disclosed herein, a lift truck scale 102 is mounted to, or part of, the lift truck carriage 104, and configured to support one or more forks or load handling fixtures 108. Thus, an operator can command the lift truck attachment system 100 to raise and/or lower to manipulate a load.

In some examples, the lift truck carriage 104 includes support brackets 118 that fit within a channel 107 of the masts 106. In some examples, the support brackets 118 are mounted flush against the masts 106, with or without a channel, and are controlled to rise and/or lower in response to a mechanical force (e.g., from a connected chain, hydraulic, etc.). One or more cross members may be arranged between the support brackets 118 to support the lift truck scale 102 and/or a forklift attachment 105.

Figure 1B:
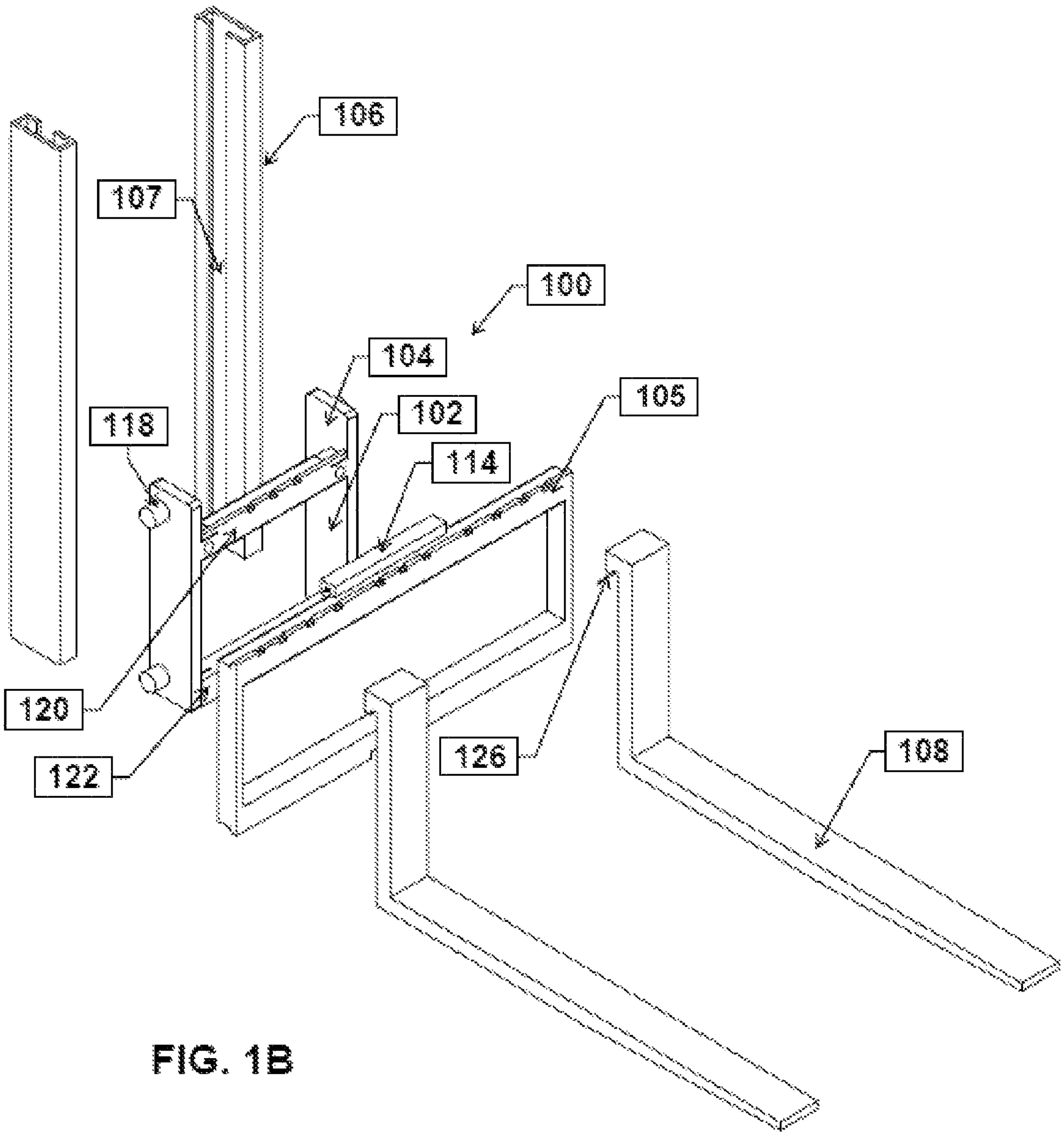
FIG. 1B is a perspective illustration of another example lift truck attachment system employing one or more sensors integrated in one or more rails, in accordance with aspects of this disclosure.
Figure 1C:
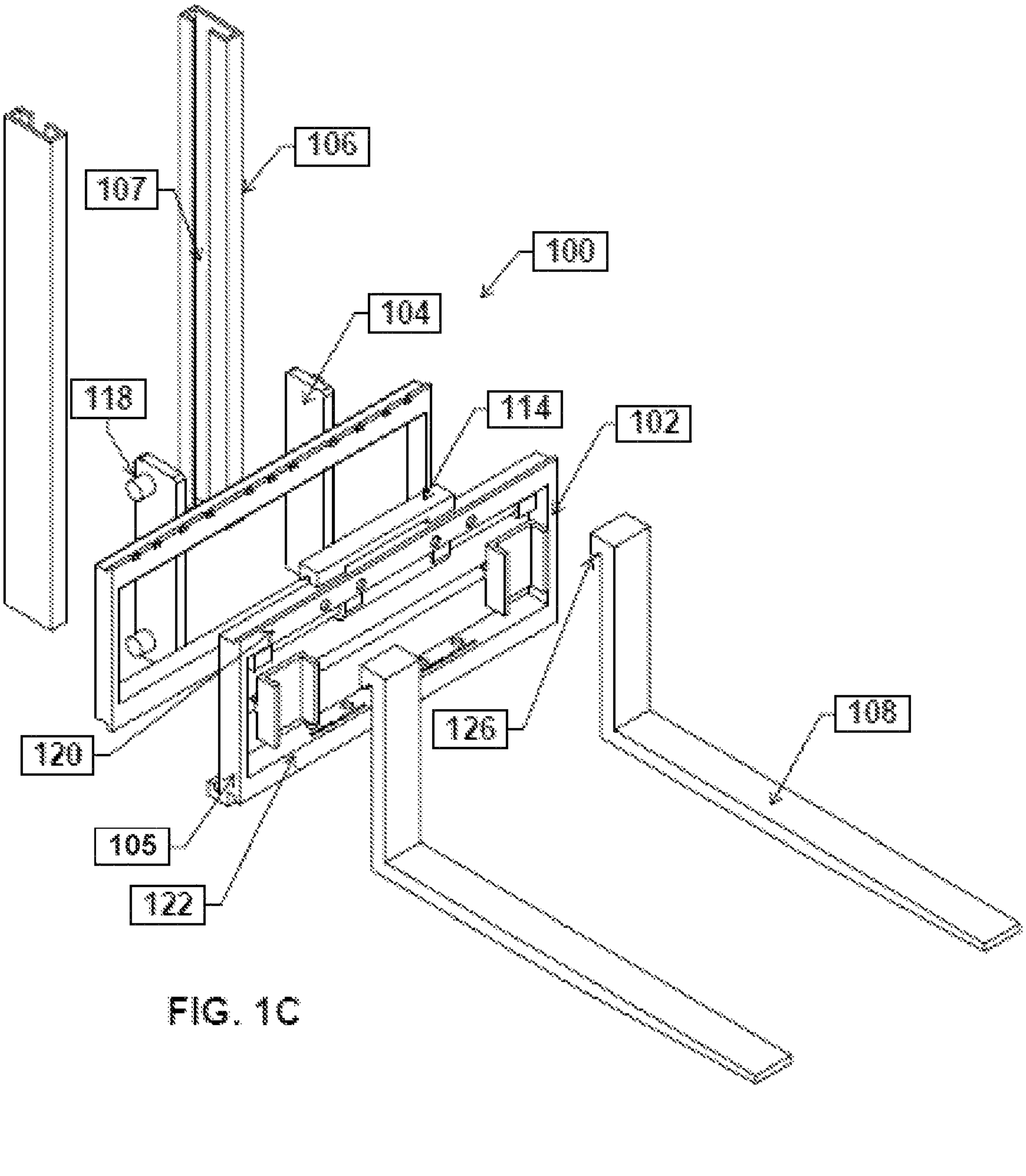
FIG. 1C is a perspective illustration of yet another example lift truck attachment system employing one or more sensors integrated in one or more rails, in accordance with aspects of this disclosure.

As shown in the example of FIGS. 1A and 1B, the one or more cross members can include a first rail 120 (e.g., an upper carriage support) and/or a second rail 122 (e.g., a lower carriage support). In FIG. 1A, the first and second rails 120 and 122 are attachment bearing cross-members mounted to the lift truck carriage 104 such that they extend beyond a front edge of the lift truck masts. In some examples, such as in FIG. 1B, the lift truck carriage 104 is configured to nest within the dimensions of the masts 106, such that support brackets 118 and/or first and second rails 120, 122 do not extend beyond a front edge of the masts 106. In some examples, such as shown in FIG. 1C, the first and second rails 120 and 122 are integrated with a forklift attachment 105.

In the example of FIGS. 1A through 1D, the first and second rails 120, 122 provide a fixture mount 130 and/or mounting mechanisms to accept and/or secure either the lift truck scale 102 or attachment 105. In some examples, the lift truck scale 102 and/or attachment 105 includes a mounting block 114, which may be configured to rest on or be secured to the forklift carriage 104, thereby supporting the weight of the lift truck scale 102, attachment 105, and/or forks 108. In examples, the mounting block 114 can function as a simply supported beam on the first rail 120, facilitating easy installation and removal, as well as added stability during use. As shown, mounting block 114 can include notches and/or other features to ensure the mounting block 114 mates with the first rail 120. In some examples, other methods or mechanism can be employed to secure the lift truck scale 102 to the lift truck carriage 104, such as bolts, pins, and/or welding.

Figure 2A:
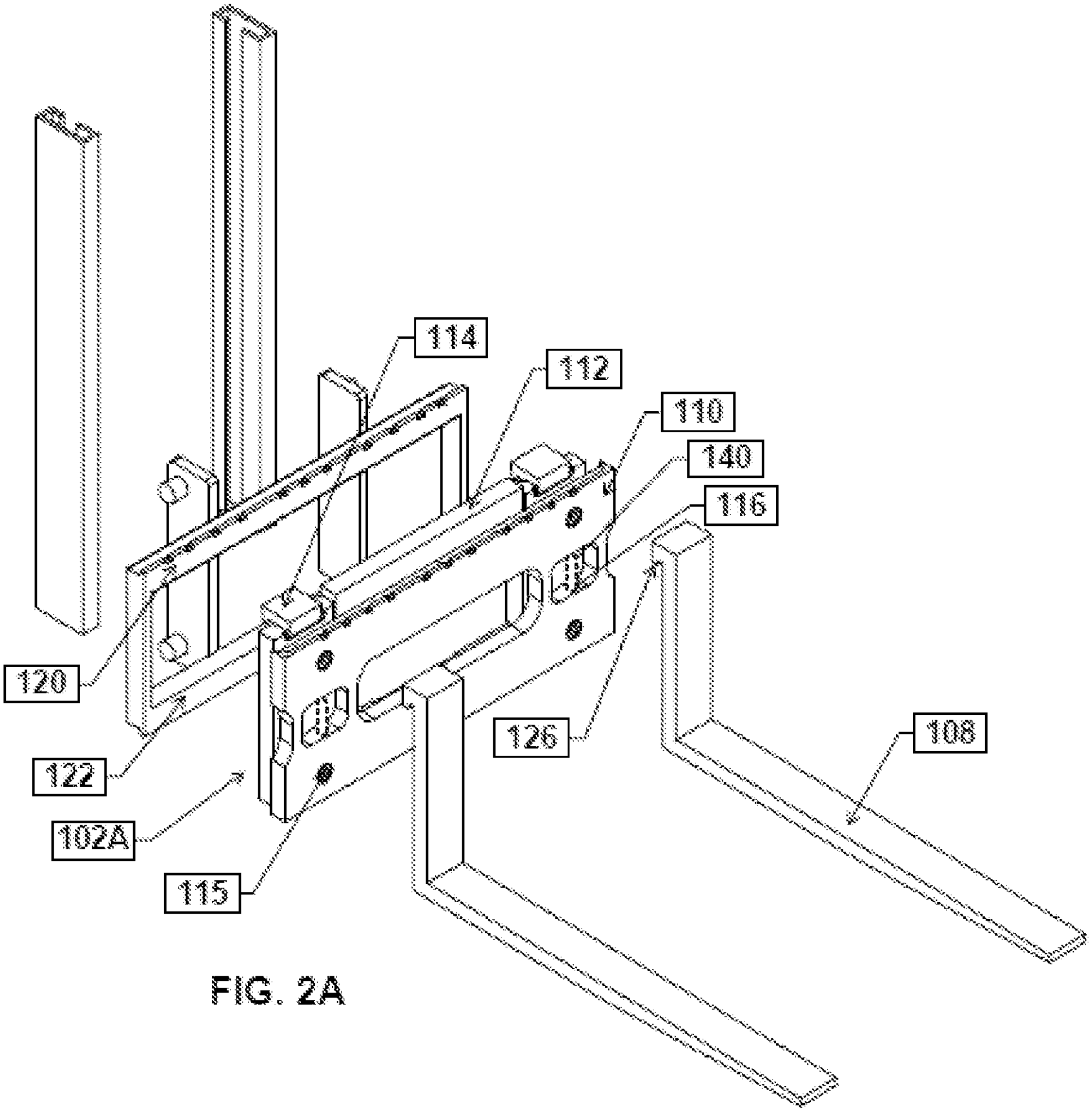
FIG. 2A illustrates a perspective view of an example lift truck weighing system, in accordance with aspects of this disclosure.

As disclosed herein, the lift truck scale 102 can include a mounting plate 112, such as a plate configured to support a loading plate 110 (see, e.g., FIG. 2A). The loading plate 110 can be secured to the mounting plate 112 by one or more fasteners 115, a weld, or other suitable technique. When assembled, forks 108 are supported by mating hook/attachment 126 with a top ridge of the loading plate 110. The lift truck scale 102 is configured to mount to the one or more rails 120, 122, which serve to lift a load as well as measure the weight thereof.

Additionally or alternatively, the carriage support between the support brackets 118 can be a one or more cross members or a plate configured to directly receive the lift truck scale 102, the loading plate 110, the-attachment 105, or the loading fixtures 108.

Although illustrated as having mating ridges/hooks, the rails, lift truck scales, loading plates, mounting plates, and/or attachments may be configured with additional or alternative mounting features, such as bolts and/or pins, such that the lift truck scale 102, attachment 105 and/or loading fixture 108 is mounted directly to a carriage support.

Figure 1D:
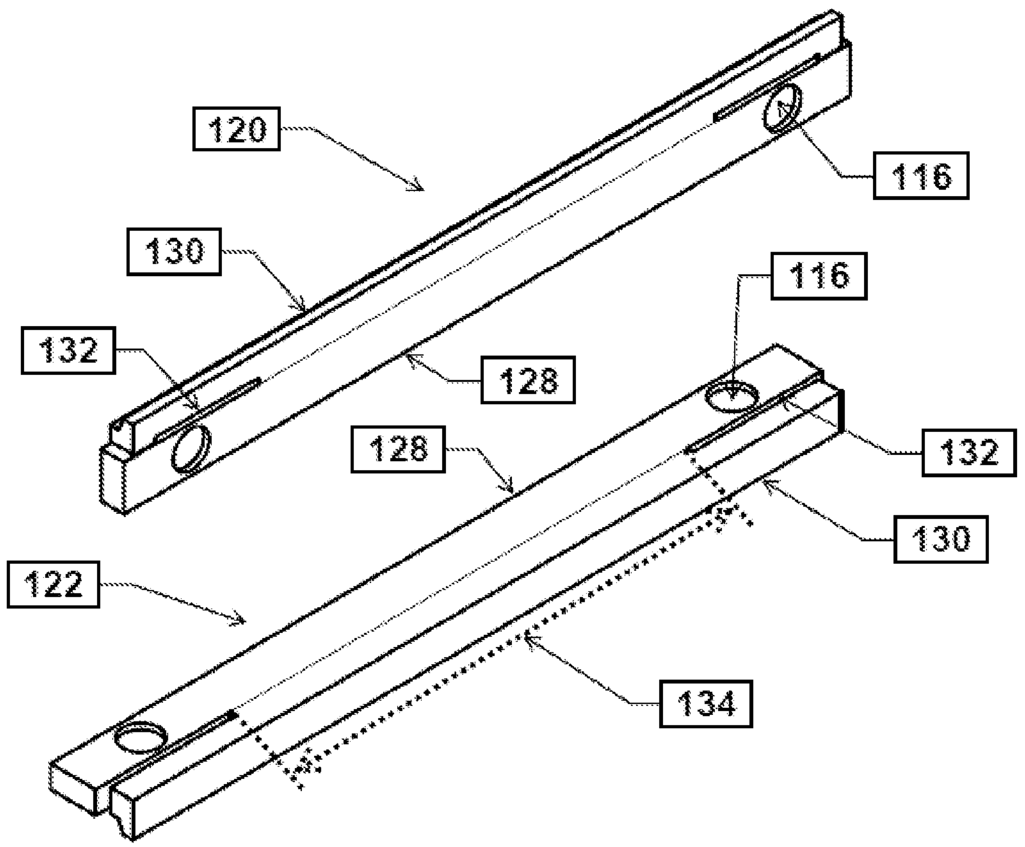
FIG. 1D is a perspective illustration of the example rails for the lift truck attachment system of FIG. 1A, in accordance with aspects of this disclosure.

As shown in FIGS. 1B and 1C, the loading fixture 108 and/or attachment 105 are configured to mount onto the first rail 120 via one or more mounting blocks 114, which generates a generally vertical force downward onto fixture mount 130, as shown in detail in FIG. 1D. Additionally, the lower portion of the loading fixture 108 and/or attachment 105 pivots toward the second rail 122, generating a generally lateral force against the fixture mount 130 of the second rail 122. As shown in FIG. 1D, fixture mounts 130 are secured to a base portion 128 of the rails, which houses one or more load sensors 116. As the loading fixture 108 and/or attachment 105 exerts a force on the fixture mounts 130, the force is transferred through the base portion 128 such that the weight of a load supported by the forks 108 is sensed by the one or more load cells 116.

Although examples are provided with each rail having two load cells 116, any number of load cells may be employed, such as a three or more load cells, or a single load cell. Further, in some examples the two rails 120 and 122 operate in concert (e.g., the respective sensors are employed simultaneously), such that measurements from each sensor or complementary sensors (e.g., from sensors on each rail, from vertically aligned sensors, and/or any combination of sensors), may be provided to a processor to calculate an accurate load weight and/or a component of the load. In addition to or in the alternative, various other parameters or features may be measured, calculated, or otherwise determined via the sensors, such as, for example, strain, end force, side force, vertical force, acceleration, angle, roll and pitch, direction of travel, torque, thrust, as a list of non-limiting examples. In some examples, a single sensor may be employed to weigh the load, and/or one or more sensors may provide a measurement at varying times and/or based on one or more triggers (e.g., a change in position, location, angle, height, etc.).

Although some examples are provided with two rails being employed, in other examples a single rail may be employed, and in yet other examples three or more rails may be employed to measure forces from a load.

Additionally or alternatively, a void or spacing 132 may be arranged at an interface between the fixture mount 130 and the base portion 128. The void 132 aligns generally with the location of the sensors 116. This arrangement serves to focus the forces onto the rails through a central portion 134 of the interface.

In some examples, the one or more load cells 116 are configured to measure a shear force transmitted through the base portion 128 and the sensors 116. Devices and/or components (not shown) may be connected to provide signals corresponding to the output from the load cell(s) 116 for analysis, display, and/or recordation, for instance.

For example, information regarding the sensed load is provided to a computing platform for analysis, display, recordation, etc. For example, a processor can be configured to receive and translate information from the one or more load cells 116 into a digital format, for display to an operator, to store in memory, and/or transmission to another computing platform, such as a central repository. In some examples, the lift truck scale 102 may include a computing platform, to perform all or part of these processing functions. In some examples, the lift truck scale 102 may include a wired and/or wireless transceiver to transmit information to another device for processing.

In examples, the load sensor 116 is a strain gauge, but can be additionally or alternatively a piezoelectric crystal, a displacement transducer, accelerometers, inclinometers and/or tilt sensors, vibrating beam sensors, fiber optic sensors, or some other type of sensor that provides desired sensitivity and accuracy. An example one or more load sensors 116 may include an impedance or resonator, such as a quartz crystal. Such sensors 116 are excited by DC, pulsed or switched polarity.

Strain gauge load cells operate under principles where deformation provides a voltage output proportional to the deformation based on the material characteristics.

A processor that receives the output is capable of resolving and measuring reactive forces acting on force sensor(s) 116.

For example, the force sensor(s) 116 are configured to generate a signal representative of the force applied during a measuring operation and transmit that signal to a device configured to receive and analyze the signal. The electrical signal output is then measured by the device and the amplitude of the load calculated as a result, where this force is translated into a signal that is sent to a circuit for evaluation.

For example, the force sensor(s) 116 may be in communication with a processor and/or other device to generate an output associated with a measured value (e.g., for display, to provide an audible alert, for transmission to a remote computing platform, for storage in a medium, etc.). The processor is configured to parse analog or digital signals from the one or more sensors in order to generate the signal. Generally, any number or variety of processing tools may be used, including hard electrical wiring, electrical circuitry, transistor circuitry, including semiconductors and the like.

The processor may be associated with a memory circuit which may consist of one or more types of permanent and temporary data storage, such as for providing the analysis on force sensor data and/or calibration. In some examples, a calibration process may be performed.

The memory can be configured to store calibration parameters for a variety of parameters, such as load cell type, force sensor type, etc. The historical measurement data can correspond to, for example, operational parameters, sensor data, a user input, as well as data related to trend analysis, threshold tension values, profiles associated with a particular measurement process and/or cable type, etc., and can be stored in a comparison chart, list, library, etc., accessible to the processor. The output from the processor can be displayed graphically, such as the current load measurement, a historical comparison, or desired load value, for instance.

FIG. 2A illustrates a perspective view of another example lift truck weighing system. In the example of FIG. 2A, an example lift truck scale 102A includes a loading plate 110 secured to a mounting plate 112 via one or more fasteners 115 and/or by other securing methods and/or mechanisms, such as welding. For example, the fasteners 115 can be used to mount the plate 112 to plate 110 via from a variety of angles or directions. Some arrangements of fasteners 115 may provide flexibility and/or space for wiring, electronics, centering pins, information or identification plates, for instance.

In the example of FIG. 2A, an opening or channel 140 is arranged between vertically paired fasteners 115. In some examples, the opening 140 is arranged between horizontally paired fasteners. Although illustrated as two openings at opposing ends of the lift truck scale 102A (e.g., aligned with mounting brackets 114), a single opening may be employed, or more than three openings may be employed.

One or more sensors 116 are located within one or more of the openings 140. For example, one or more support elements may secure a sensor within the opening 116, such that forces transmitted through the lift truck scale 102A are measured by the sensor(s) 116. The sensor(s) 116 may measure a load and/or transmit such measurements as disclosed herein.

In examples, each opening is substantially identical. In some examples, one or more of the openings have a different depth or a different width. In some examples, one or more of the openings are filled with a material having different characteristics than a material used to form the plate or structure housing the sensor.

Figure 2B:
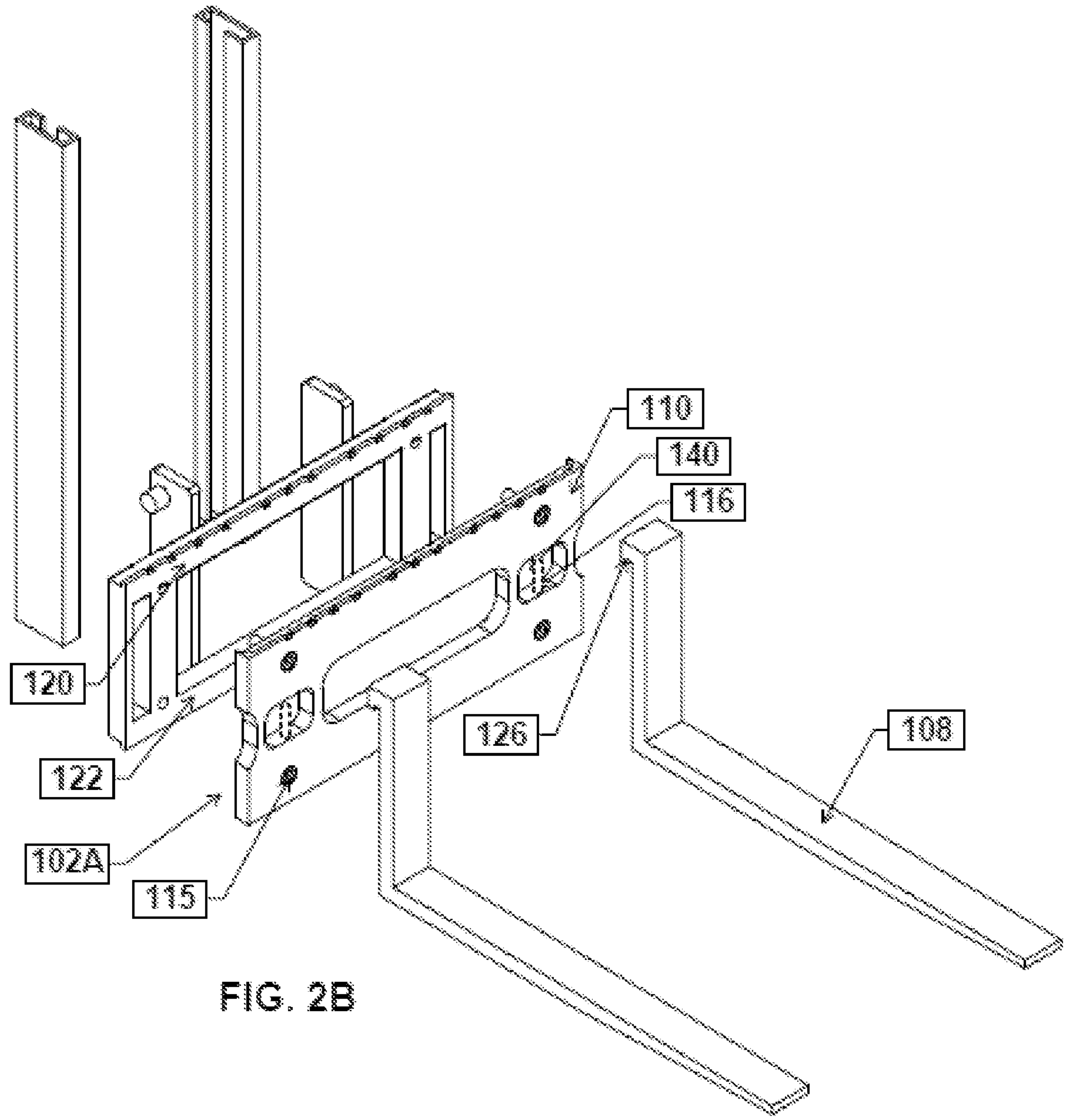
FIG. 2B illustrates a perspective view of another example lift truck weighing system, in accordance with aspects of this disclosure.

Although the opening and sensor are illustrated as arranged within the loading plate 110 in FIG. 2A, in some examples (e.g., shown in FIG. 2B) a single plate may be used (e.g., either of a mounting plate or loading plate), or another type of load fixture mounting arrangement or device, such that the opening and sensor may be provided in a single plate or alternative mounting device.

Figure 2C:
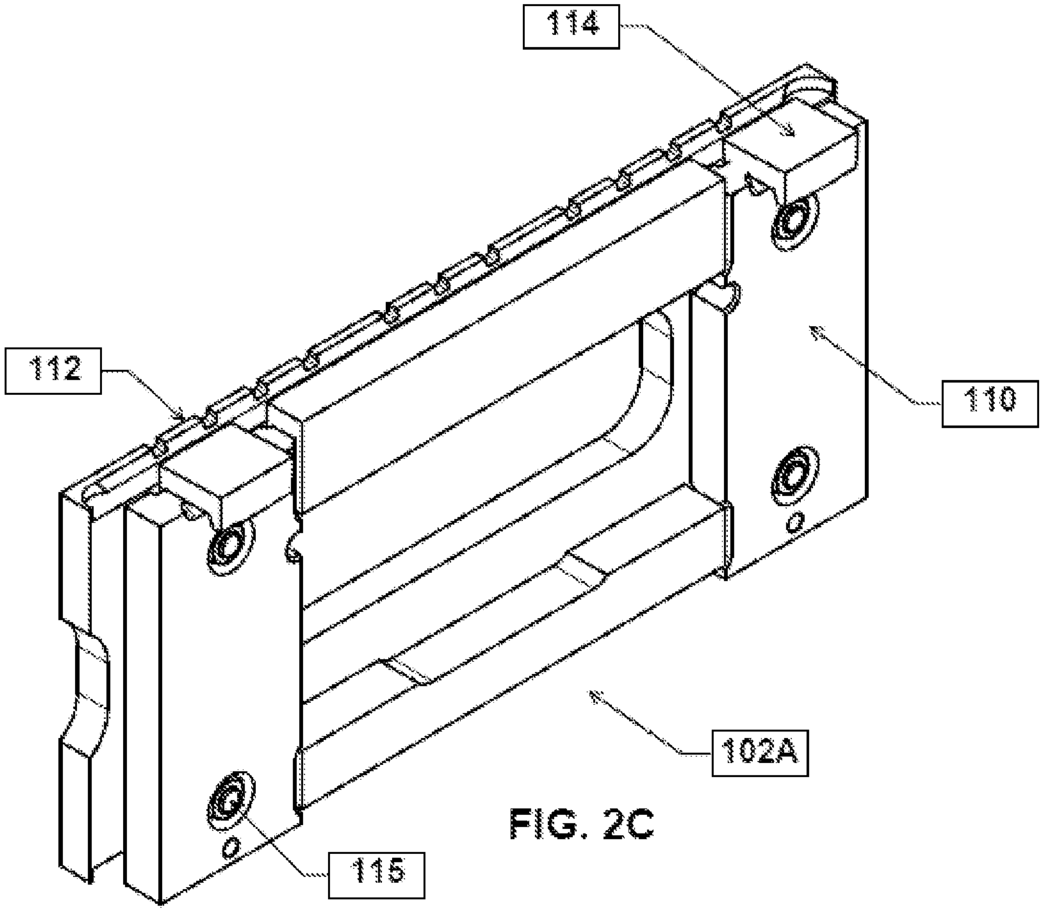
FIG. 2C illustrates a perspective rear view of the example lift truck weighing system of FIG. 2A, in accordance with aspects of this disclosure.

FIG. 2C illustrates a perspective rear view of the example lift truck scale 102A provided in FIG. 2A. As shown, the attachment 114 is designed to extend into the space between the masts 106, thereby limiting the distance between the front edge of the masts 106 and the base 112. Such an arrangement provides a lower profile for the lift truck attachment system 100 versus conventional designs, where support mounts extend beyond the front edge of the masts. As shown in the disclosed examples, the load bearing portion of the carriage supports 120, 122 are substantially located between the masts 106. For example, the attachment 114 interfaces directly with upper carriage support 120, such that device mounting cross-members on the surface of the masts 106 are avoided.

Figure 3A:
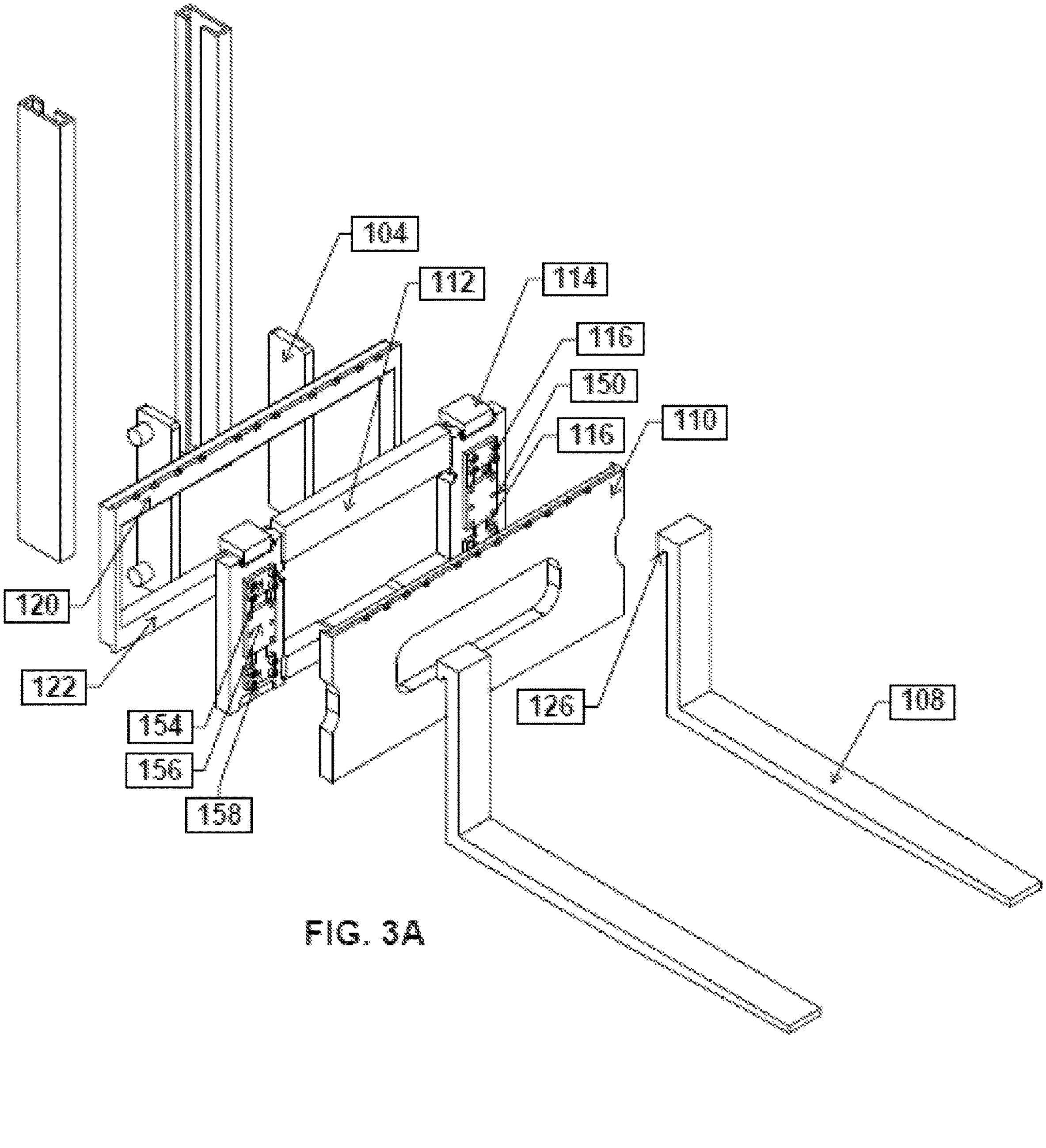
FIGS. 3A to 3C illustrate several perspective views of an example lift truck weighing system with an example sensor plate, in accordance with aspects of this disclosure.
Figure 3C:
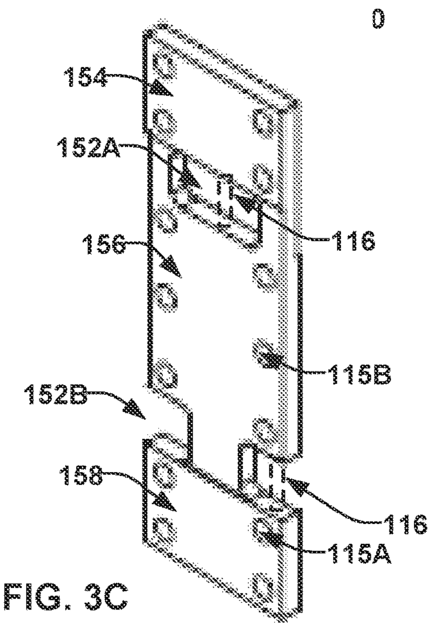
Figure 3B:
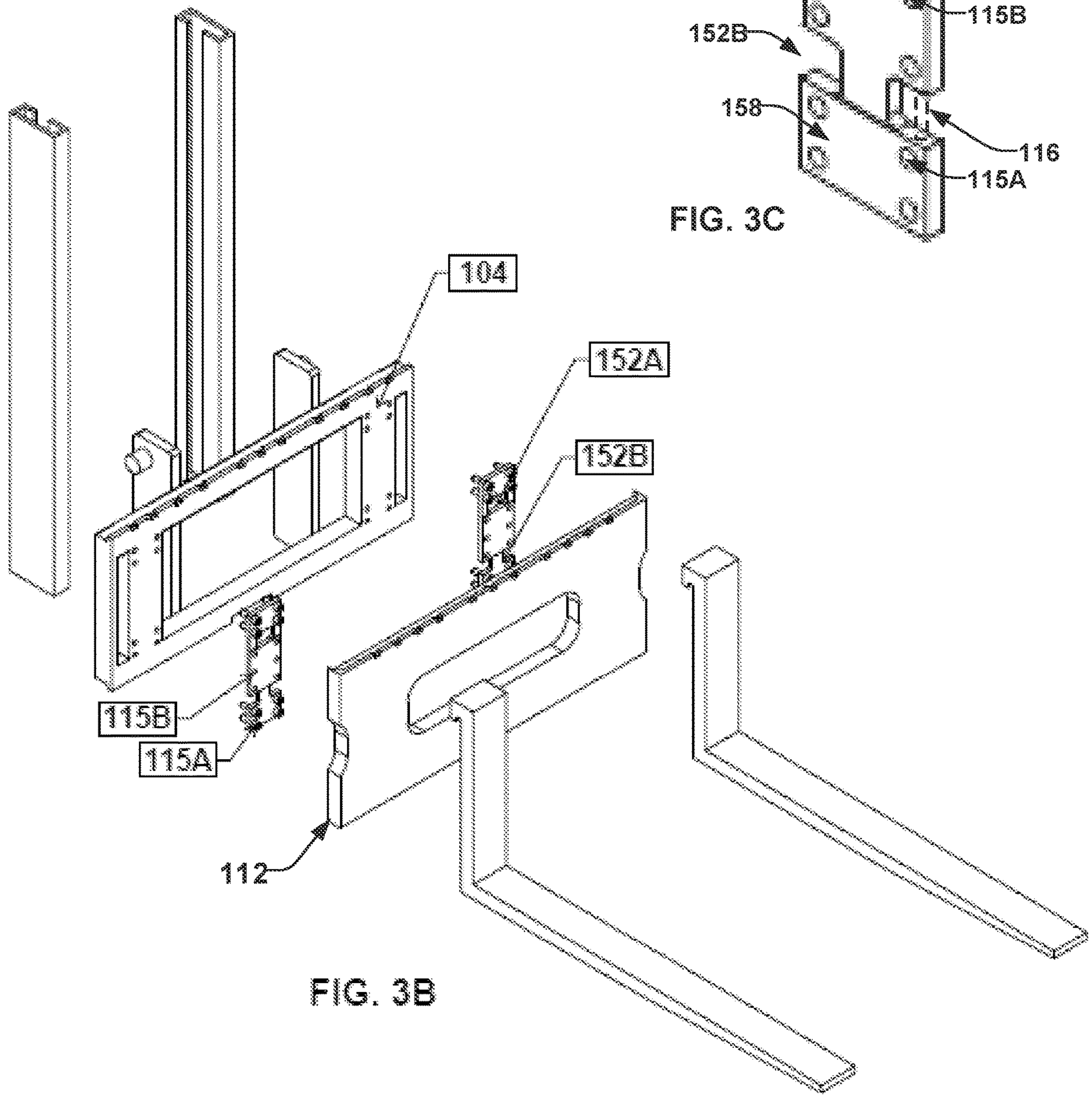

FIGS. 3A and 3B provide perspective views of an example lift truck weighing system with an example sensor plate 150 for use in a lift truck scale, in accordance with aspects of this disclosure. For example, the sensor plate 150 includes a first or top portion 154, a second or central portion 156, and a third or lower portion 158. The various portions are separated by one or more voids 152A, 152B, which are configured to house one or more sensors 116.

In some examples, the first portion 154 and the third portion 158 are secured to a first mounting surface (e.g., of a mounting plate) via one or more fasteners 115A, and the second portion 156 is secured to a second mounting surface (e.g., of a loading plate) via one or more fasteners 115B. As shown in the example of FIGS. 3A to 3C, the sensors 116 and the voids housing them are arranged at an interface between mounting arrangements, such that any forces traveling from one mounting surface to a second mounting surface impacts the sensors 116.

As disclosed herein, a loading plate may receive fixturing which supports a load. Forces from the weight of the load travel through the loading plate, then through the sensor plate 150, and into the mounting plate. As the forces traverse the voids 152A and/or 152B, the sensors 116 arranged therein measure the forces, such measurements can then be provided to another device for processing, in accordance with aspects of this disclosure.

One or more of the voids 152A and/or 152B may be enclosed by portions of the sensor plate 150 (such as the illustrated void 152A), and/or have one or more sides exposed (such as the illustrated void 152B). Further, although illustrated as oriented substantially vertically, the sensor plate 150 may be oriented at any angle, such as substantially horizontally.

Returning to FIG. 3A, the sensor plate 150 is secured to a mounting plate 112 (e.g., a first mounting surface) and configured to be secured to a loading plate 110 (e.g., a second mounting surface). As shown, a pair of sensor plates 150 are aligned with the mounting brackets 114 and secured to the mounting plate 112 at the first or top portion 154 and the third or lower portion 158 via one or more fasteners 115A and 115B, as shown in FIG. 3B.

FIG. 3B illustrates a perspective view of another example lift truck weighing system with the sensor plate 150 secured to a loading plate 110 (e.g., a second mounting surface) but without a mounting plate 112. Instead, the sensors plate 150 is directly attached to either the forklift carriage 104 or an attachment 105.

FIGS. 4A to 4D illustrate example lift truck weighing systems, such that a sensor 116 is arranged at a mounting interface between a forklift carriage 104 and loading fixture 108 (and/or another support bracket fixed to a mast).

Figure 4A:
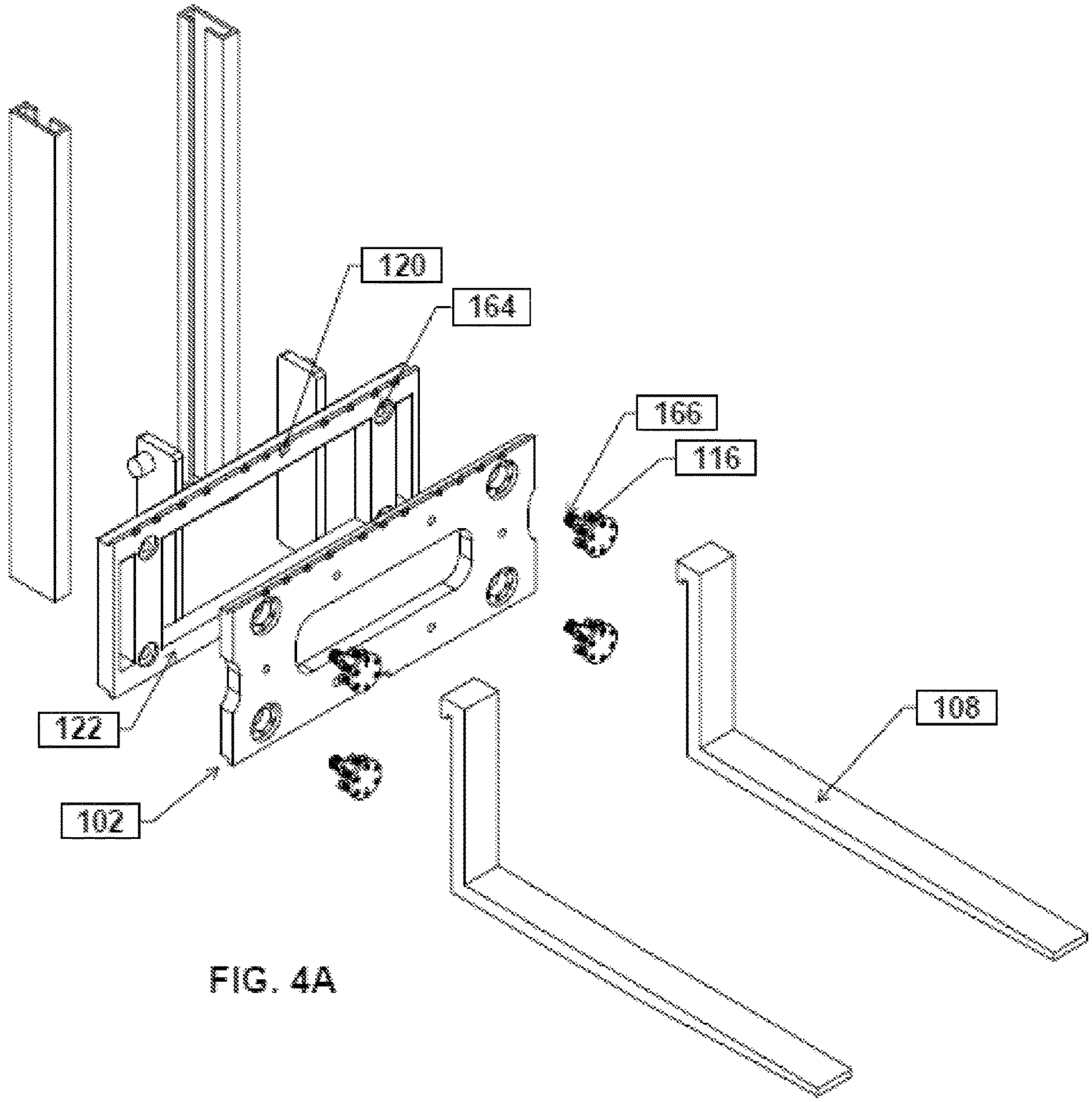
FIGS. 4A to 4D illustrate example lift truck weighing systems, in accordance with aspects of this disclosure.

In the example of FIG. 4A, one or more openings or holes 164 are provided in the rails 120, 122, and are configured to accept a fastener 166 with an incorporated sensor 116. Thus, when mounted to the rails 120, 122, any force traveling from the lift truck scale 102 to the rails 120, 122 will pass through the sensors 116.

Figure 4B:
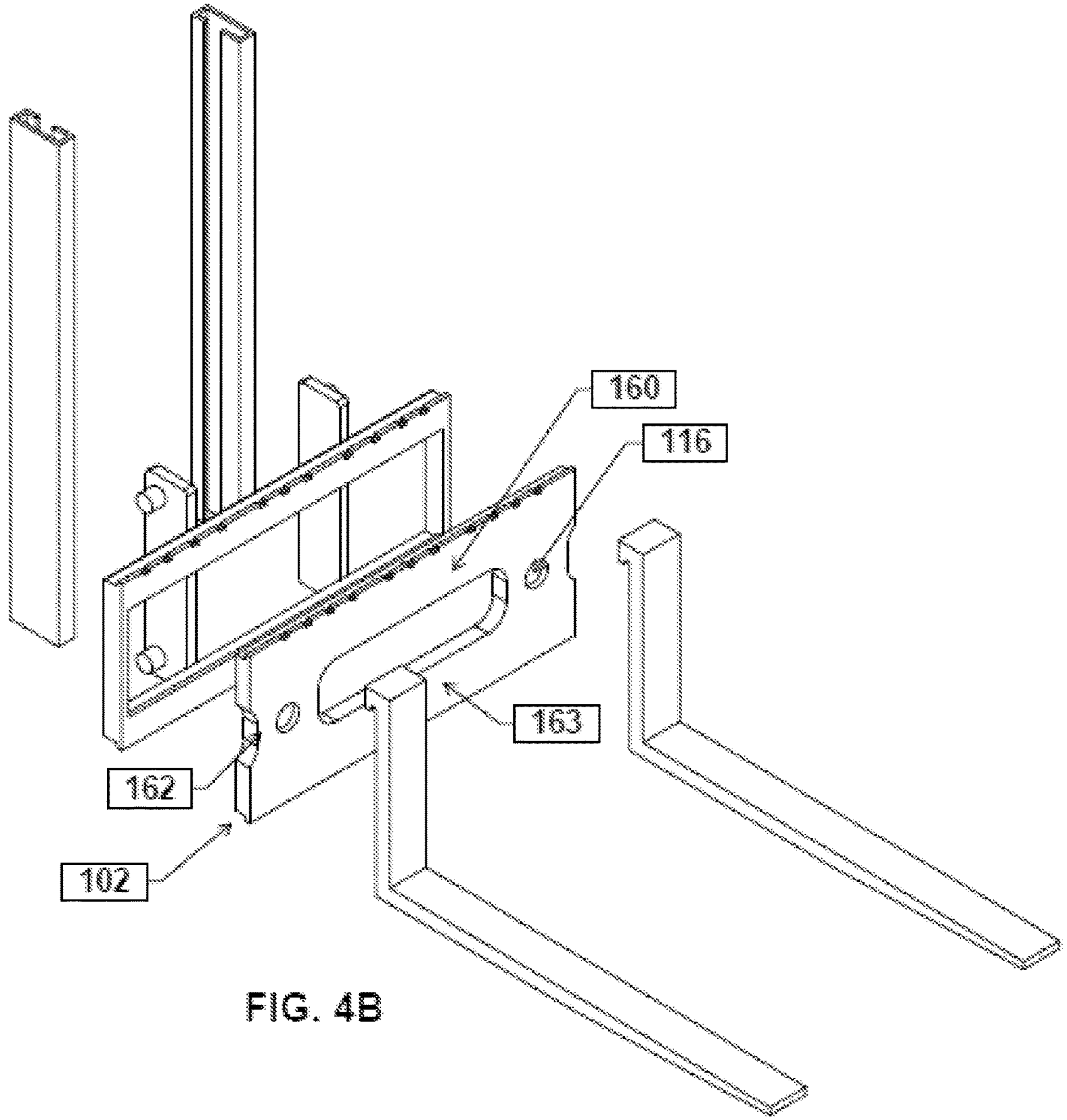
Figure 4C:
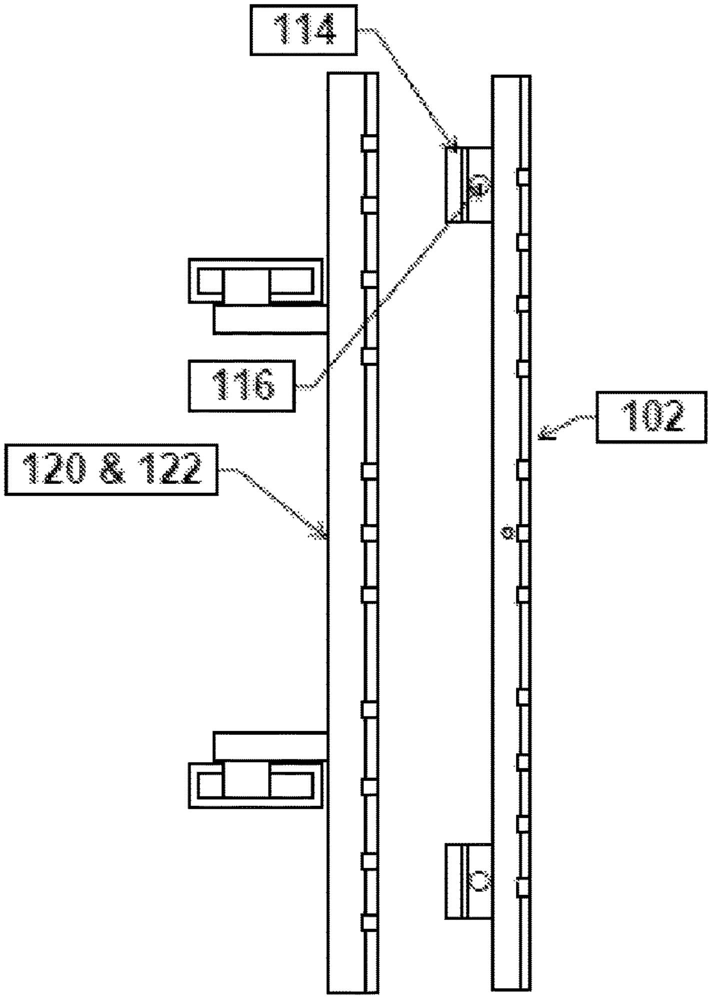
Figure 4D:
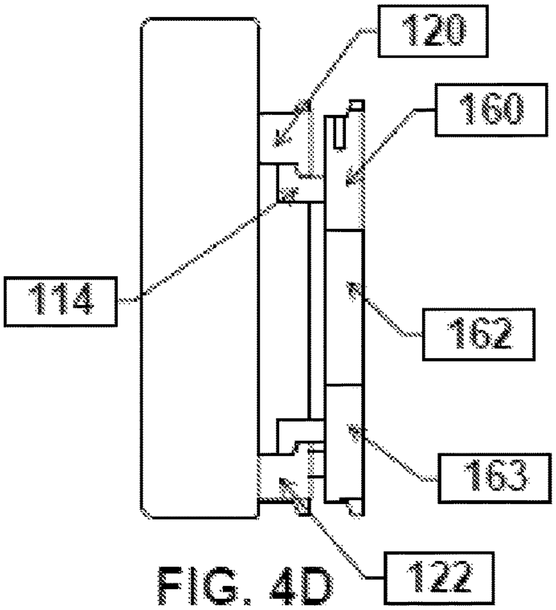

In the example of FIGS. 4B and 4D, sensors 116 are arranged within the lift truck scale 102 between the top portion 160 (to support load fixturing) and a bottom portion 163. A central portion 162 includes one or more mounting brackets 114 mounted thereto (e.g., via fasteners, welding, pins, etc.), which interface with the rails 120, 122 to secure the lift truck scale 102. Thus, any force traveling from the lift truck scale 102 to the rails 120, 122 will pass through the sensors 116.

The lift truck scale 102 is configured to support a load handling fixture. As shown in FIG. 4C, the lift truck scale 102 is then secured to the rails 120, 122 via mounting brackets 114. One or more sensors 116 are incorporated within one or more of the mounting brackets 114, such that any force traveling from the lift truck scale 102 to the rails 120, 122 will pass through the sensors 116, which can provide measurements to a computing platform for processing, as disclosed herein.

Additionally or alternatively, the arrangement or orientation of the rails can be reversed, such that the rail 122 becomes load bearing, for example, as shown in FIG. 4D. In some examples, a retaining device can be mounted to the lift truck scale 102 and/or one of the rails 120, 122, to prevent the lift truck scale 102 from inadvertently dislodging from the lift truck carriage 104.

In some examples, one or more of the attachment features (the lift truck scale, mounting plate, loading plate, rails, mounting brackets, loading fixtures, fasteners, etc.) include a preloaded connection (such as a spring, bolt, pin, etc.) to absorb shock and/or to bias the mating surfaces toward one another, resulting in a force to maintain constant contact. In some examples, a shape of the mating surface can be modified to achieve a desired performance result. Such modifications can include a cast ball-shaped interface, mating V-shaped contacts, grooves, ridges, etc.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A lift truck carriage comprising one or more rails, each rail comprising:

a fixture mount to support one or more load handling fixtures upon a top ridge of the rails such that the load handling fixtures exert a vertical downward force on the rails; and a base portion to house a one or more load sensors configured to measure forces on the one or more rails from the one or more load handling fixtures, wherein the fixture mount has a void at an interface between the base portion and the fixture mount, the void being aligned with the one or more load sensors.

2. The lift truck carriage of claim 1, wherein the one or more load handling fixtures are mounted to a plate supported by the one or more rails.

3. The lift truck carriage of claim 1, wherein the one or more rails is removably secured to the lift truck carriage.

4. The lift truck carriage of claim 1, further comprising two or more support brackets configured to secure the one or more rails in a fixed orientation, and arranged between a pair of masts of a lift truck.

5. The lift truck carriage of claim 4, wherein the one or more rails comprises a first and a second rail, the first rail oriented within the support brackets such that a first fixture mount of the first rail is arranged above a first base portion housing a first load sensor of the one or more load sensors.

6. The lift truck carriage of claim 5, wherein the second rail is oriented within the support brackets such that a second fixture mount of the second rail is arranged laterally to a second base portion housing a second load sensor of the one or more load sensors.

7. The lift truck carriage of claim 6, wherein the second fixture mount is oriented facing opposite a lift truck.

8. A lift truck weighing device comprising:

a loading plate configured to support one or more load handling fixtures;

a mounting plate configured to secure the lift truck weighing device to a lift truck carriage;

one or more sensor plates arranged between the loading plate and the mounting plate, the one or more sensor plates being secured to the loading plate at a first portion and secured to the mounting plate at a second portion; and one or more sensors arranged on the one or more sensor plates between the first and second portions, the one or more sensors configured to measure forces transferred from the loading plate to the mounting plate through the one or more sensor plates.

9. The lift truck weighing device of claim 8, wherein a first sensor of the one or more sensors is arranged on an upper portion of a first sensor plate of the one or more sensor plates, and a second sensor of the one or more sensors is arranged on a lower portion of the first sensor plate.

10. The lift truck weighing device of claim 8, wherein the one or more sensor plates comprises one or more voids configured to house the one or more sensors.

11. The lift truck weighing device of claim 10, wherein a void of the one or more voids is arranged between the first and second portions of the one or more sensor plates.

12. The lift truck weighing device of claim 8, wherein the one or more sensor plates further comprises a third portion adjacent the second portion and opposite the first portion.

13. The lift truck weighing device of claim 12, wherein a sensor of the one or more sensors is arranged between the second and third portions of the one or more sensor plates.

14. The lift truck weighing device of claim 13, wherein the one or more sensor plates are secured to the loading plate at the third portion of the one or more sensor plates.

15. The lift truck weighing device of claim 8, wherein the one or more sensors is one or more of a strain gauge, a piezoelectric crystal, a displacement transducer, an accelerometer, an inclinometer or tilt sensor, a vibrating beam sensor, a fiber optic sensor, or a resonator.

16. The lift truck lift truck carriage of claim 1, wherein the one or more load sensors is one or more of a strain gauge, a piezoelectric crystal, a displacement transducer, an accelerometer, an inclinometer or tilt sensor, a vibrating beam sensor, a fiber optic sensor, or a resonator.

* * * * *